Sept. 19, 1939.   C. G. RICHARDSON   2,173,613
CLOTH SHEARING MACHINE
Original Filed July 22, 1935   2 Sheets-Sheet 1

Inventor
C. G. Richardson
by Geo. N. Goddard,
Attorney

Sept. 19, 1939. C. G. RICHARDSON 2,173,613
CLOTH SHEARING MACHINE
Original Filed July 22, 1935 2 Sheets-Sheet 2

Inventor
C. G. Richardson
by Geo. N. Goddard,
Attorney

Patented Sept. 19, 1939

2,173,613

UNITED STATES PATENT OFFICE 2,173,613

CLOTH SHEARING MACHINE

Charles G. Richardson, Springfield, Vt., assignor to Parks & Woolson Machine Company, Springfield, Vt., a corporation of Vermont Application July 22, 1935, Serial No. 32,551
Renewed February 17, 1939

10 Claims. (Cl. 26—15)

This invention relates to cloth shearing machines of the type used for cropping or face shearing the nap or pile threads of textile fabrics and one of the principal objects in view is to provide a construction and arrangement which will make it commercially practicable to operate the shearing cutters or fly blade at very much higher speeds than has been practicable with any constructions heretofore known. Not only will such higher speeds of the fly blade result in cleaner and more perfect cutting of the nap threads, but it makes it possible to feed the cloth to be sheared through the machine at very much higher speeds of travel than has been heretofore possible.

The operation of the heavy fly blades at greatly increased rates of speed, however, presents very practical difficulties which must be overcome. Not only does the higher speed of the fly blade tend to unduly increase the heating of the ledger blade, but it sets up so much greater stresses and vibration that the preservation of the requisite relationship between the blades and the cloth rest cannot be maintained with any previously known construction and arrangement. Nevertheless, I have found it possible to overcome these difficulties by providing practical means for preventing overheating of the ledger blade, and for effecting better presentation of the nap or pile threads to the line of shearing and by provision of a construction for mounting the ledger blade and the fly blade so that their correct operative relationship may be effectively maintained without disturbance or displacement. My present improvements also include provision of adequate, reliable and convenient arrangements for taking up wear of the blades without disturbing their requisite parallelism of alignment after that alignment has once been effected and also permit a resetting to accommodate the shearing action to any desired length of nap.

These and other features of the invention will be particularly described in the following specification and will be defined in the claims hereto annexed.

Figure 1:
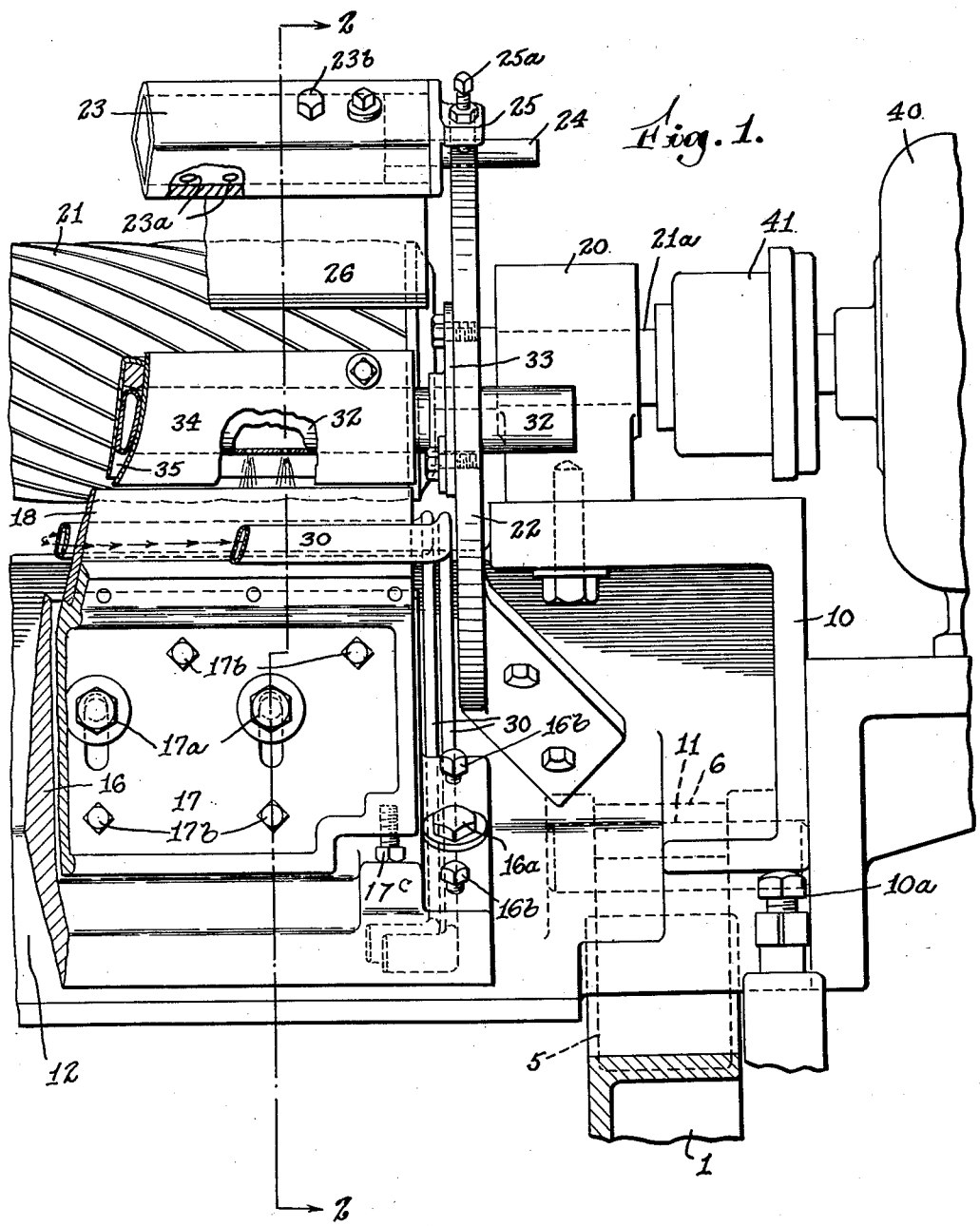

In the accompanying drawings is illustrated so much of the construction of a cloth shearing machine as is necessary for an understanding of the present improvement, in which Fig. 1 is a front elevation of the right hand end portion of a cloth shearing machine embodying the principles of this invention, the parts in front of the ledger blade or line of shearing, including the cloth rest, being omitted to better show the construction of parts behind the cloth rest.

Figure 2:
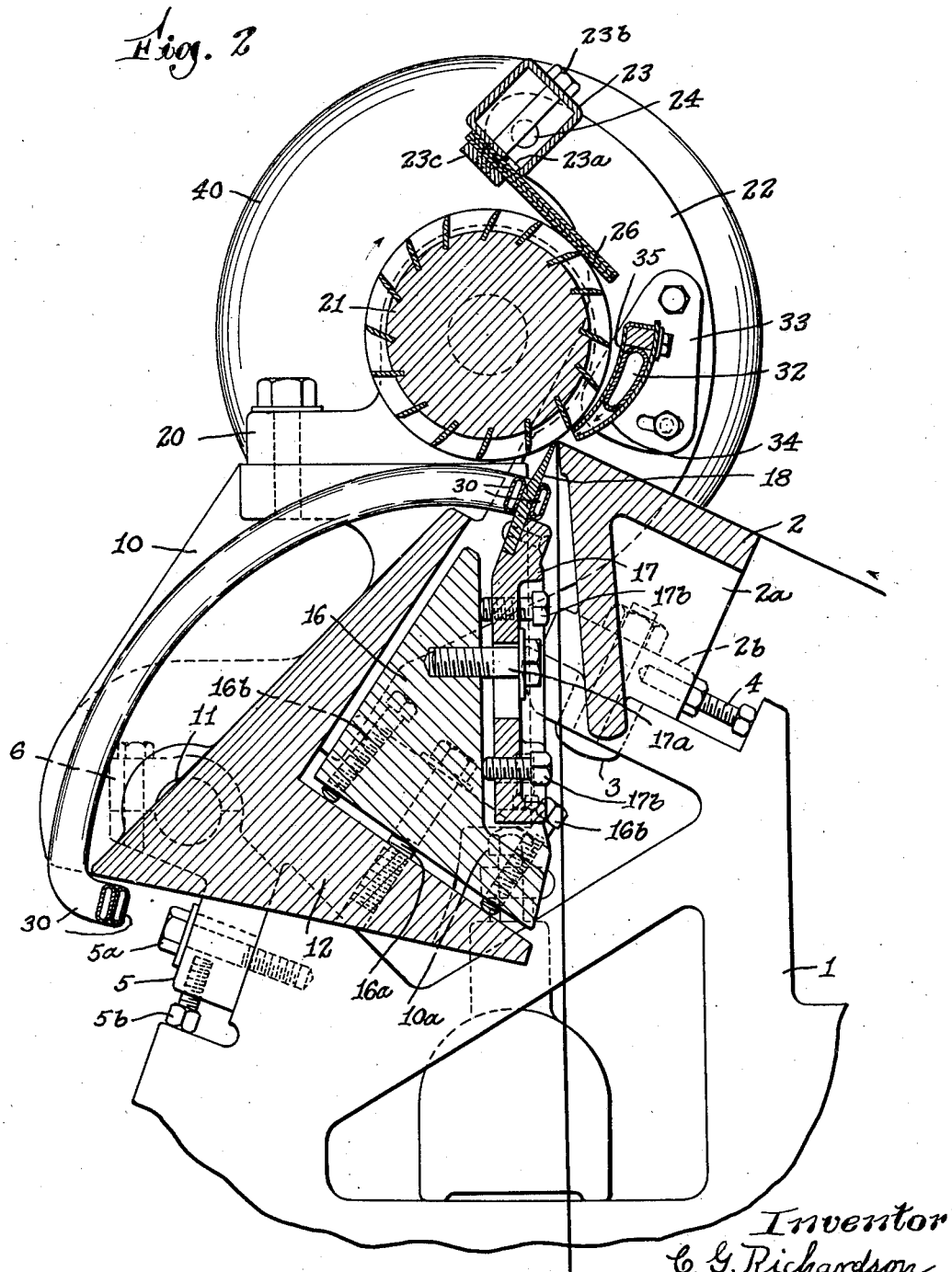

Fig. 2 is a vertical section on the plane 2—2 of Fig. 1, including also the cloth rest construction in front of the shearing cutters.

The general arrangement of the shearing parts is somewhat similar to that shown in my earlier Patent No. 1,686,499, many of which are in satisfactory operation at this time although the construction therein shown is not capable of meeting the exacting requirements involved in operating a shearing machine at the high speeds that are practical with the improvements hereinafter set forth.

In practice the frame work of the machine comprises suitable end frames 1 tied together by any known or suitable cross connecting means or girt and provided with suitable bearings for supporting the various parts, although the present invention is concerned primarily with the mounting of the pivotal fly-blade carrying frame 10 and the mounting of the ledger blade 18 and of the cloth rest 2, the details of which will now be explained.

Each end frame 1, or side frame as it is also called, is provided with a bearing box 5 which is bolted firmly to a supporting face of the frame by a clamping bolt 5a passing through a slot in the bearing box, the bearing being split and provided with a bearing cap 6 to complete the bearing which receives one of the end trunnions 11 of the pivotal cutter blade head 10, so that the cutters may be raised from, and lowered to, operative position or relation to present the cutters in proper relation to the apex or edge of the cloth rest 2. A thrust screw 5b serves to raise or lower each cutter head bearing box when the clamping screws 5a are loosened, thus permitting an up and down adjustment of the bearing boxes in a plane approximately parallel with the plane of the ledger blade 18. This serves to elevate the fulcral point of the cutter head and its swinging movement about the fulcral axis is limited by means of an adjustable stop screw 10a carried at each end of the cutter head and arranged to rest upon a fixed stop supported by the shear frame 1.

Upon the upper portion of the pivotal cutter head 10 is mounted and secured a suitable bearing box 20 for receiving an end gudgeon of the rotary fly blade 21. The projecting end of the gudgeon or journal 21a is connected by any suitable type of flexible coupling at 41 with the coaxially aligned shaft of an electric motor 40.

The cutter head 10 is provided at each end with an upwardly extending bracket 22 in whose upper portion above the rotary fly blade is pivotally mounted an oil or lubricating reservoir 23 by means of projecting gudgeons 24. At one end the oil reservoir 23 is provided with an offset lug 25, in which is mounted a set screw 25a so as to permit some angular adjustment of the oil reservoir to vary the pressure of the oil transferring swab 26, which extends along the length of the fly blade and lies in contact therewith. The tubular reservoir 23 is provided at its bottom with outlet holes 23a to allow the escape of oil and these outlet holes are covered by strips of felt 26, or other oil absorbing material, which are clamped against the bottom of the reservoir 23 by means of a clamping screw 23b and a clamping plate 23c. The seepage of oil through the lubricating swab 26 can be regulated by tightening the clamping bolts 23b, since the more tightly the swab is clamped against the bottom the more gradual is the seepage of oil.

The cloth rest preferably comprises a substantially V-shaped cross beam 2 with vertical stiffening webs 2a, the outermost of which are provided with outwardly projecting flanges 2b having slidable engagement with the underneath supporting portion of the shear frame to which they are secured by clamping bolts 3, while provision for the forward and rear adjustment comprises a thrust screw 4 whose head thrusts against a projecting portion of the frame 1, so as to sustain the forward thrust or pressure resulting from the tension of the cloth passing over and down across the rear of the cloth rest.

It will be understood that it is of vital importance in the operation of a shearing machine of this type, particularly if the machine is to be operated at high speed, that adequate provision for mounting the ledger blade be made so that when set to an accurate straight edge alignment there will be no danger of its being sprung from that straight edge alignment or being displaced from its parallelism with the revolving cutter or fly blade.

With this object in view instead of employing a light, comparatively flexible reenforcing plate, as shown at 4b in my aforesaid prior patent, I provide a heavy and quite stiff casting or ledger blade beam 17 whose upper corner is machined to provide angularly disposed blade supporting faces finished off to as nearly true straight edge lines as possible and against these guiding surfaces the lower or back end of the ledger blade is placed and firmly riveted. This ledger beam support being made of cast iron and accurately machined holds the thin ledger blade 18 in a very close approximation to a straight edge so that only very little warping or springing of the casting is necessary to secure a perfectly true straight edge alignment of the cutting edge of the ledger blade. Such slight springing can be readily effected by adjustment of the thrust or set screws 17b, while the beam itself is clamped firmly to an intermediate adjustable cross head 16 of very stiff and rigid construction, preferably wedge shape in cross section.

At its opposite ends the heavy cross head 16 is provided with outwardly projecting flanges extending from its bottom portion, each of which receives a medial clamping screw 16a that is arranged between two thrust screws 16b, thus permitting not only vertical adjustment of the supporting crosshead 16 but also making it possible to impart a slight angular adjustment by which the whole unit embracing the ledger blade and the ledger beam may be pressed toward, or eased from, the shearing line of the fly blade.

The heavy transverse girt 12 connecting the two end arms 10 of the cutter head forms a rigid, inflexible base for supporting the whole ledger blade unit. The inherent stiffness of the ledger blade beam 17 and the complete rigidity of the cross head 16 and of the supporting girt 12 prevents all springing or distortion of the ledger blade from its proper straight edge alignment in parallelism with the path of the revolving cutters. It also permits full and complete adjustment of the ledger blade with relation to the cloth rest and the peripheral path of the revolving cutters.

Further increase in the flexibility of adjustment of the coacting parts is effected by means of the positioning and clamping screws 4 and 3 that hold the heavy cloth rest in proper relation to both shearing elements.

The bearing elements 20 provide fixed aligned bearings for the opposite ends of the fly blade, but as it is preferred to keep the shearing line at a constant position it will be seen that this may be accomplished because the adjustment of the dial screws 10a permits the cutter head to be lowered sufficiently to compensate for the wearing down and grinding of the revolving cutter blades, so that their circumferential path at the shearing line can always be kept constant while the adjustment of the thrust screws 16b allows the worn ledger blade to be raised and set to the same shearing line.

The anchoring of the ledger blade to a fairly rigid stiff and heavy supporting beam allows it to maintain its alignment in spite of the stresses and vibrations set up at high speed and after it is once aligned against a straight edge all the desired adjustments up and down, or in an angular direction within the required range, may be effected by means of the set screws 17c and the clamping screws 16b respectively. Accordingly, there is no distortion from the straight line position or from the exact parallelism between the cutter elements that is vitally necessary to effect good shearing.

To prevent overheating of the ledger blade 18 under the rapid high speed action of the revolving cutter, I apply to the ledger blade a heat transferring means through the agency of a flattened tube 30, which is placed in direct contact with both faces of the ledger blade intermediate the ends thereof and through which there is maintained a circulation of refrigerating fluid, the flattened tube being bent around one end of the ledger blade and maintaining contact with both faces to the other end. One ledge of the tube serves as an inlet conduit and the other as an outlet conduit for the refrigerating fluid, which may be of any suitable refrigerant such as commonly used in electric refrigerators.

To still further cool the cutting edge of the ledger blade I provide an air blast delivery tube 32, which is secured to a supporting plate 33 that is adjustably attached to the upward extension 22 of the cutter head. This tube is provided at its lower end with outlet perforations and is enclosed between two nozzle plates 34 and 35, which converge to a delivery nozzle slightly in front of, and in close juxtaposition to, the shearing line. Not only does this air blast serve to carry away heat from the tip of the ledger blade, but it also acts to raise the nap threads and present them more effectively to the action of the revolving cutters as the cloth passes around the apex at the rear of the cloth rest. The refrigerating tube may be brazed, soldered or otherwise secured in close contact with the ledger blade so as to effect rapid absorption of the heat thereby.

The controlled refrigeration of the cutter blades by the oil swab, the cooling action of the air blasts and of the refrigerating medium, together with the stable and solid mounting of the ledger blade while making complete provision for all required adjustments, makes it possible to operate this machine at speeds far in excess of those which have been practicable with prior constructions of shearing machines. The required range of adjustment of the ledger blade is so slight that the long curved arms of the refrigerating tube 30 will easily yield sufficiently to accommodate such adjustments without distorting or disturbing the accurate straight edge alignment and positioning of the ledger blade itself, since the slight resistance of those tubes will have no effect in deforming the heavy ledger beam to which the blade is affixed.

Since the mounting of the ledger blade shown and described permits a far greater flexibility of adjustment for the purpose of securing a perfectly straight edge alignment of the blade, further detailed explanation of this feature will now be given.

Instead of the straight line arrangement of the adjusting screws shown in my aforesaid Patent No. 1,686,499 for straightening the ledger blade, I have arranged in this case the adjusting screws in a triangular grouping, as shown in Fig. 1, that is, the set or thrust screws 17ᵇ are arranged in two rows, one above and one below the level of the clamping or binder screw 17ᵃ and this results in giving complete universality and fineness of adjustment far beyond what was obtainable in the construction disclosed in my aforesaid patent. For example, referring to Fig. 1, if it be desired to spring outward the right hand end portion of the ledger blade this may be effected by turning in the right hand upper set screw 17ᵇ. On the other hand, if it be desired to spring inward this portion of the blade this can be effected by the turning in of the right hand lower set screw 17ᵇ which acts through the fulcrum support afforded by the right hand binder screw 17ᵃ to spring in that portion of the blade subject to suitable or desired adjustments of the oppositely disposed set screws in the upper row on either side of said binder screw 17ᵃ. This triangular arrangement being continued across the length of the ledger blade casting 17 from one side to the other of the machine makes it possible to secure a perfect straight edge alignment of the ledger blade which need not be thereafter disturbed, since the intermediate non-distortable cross head 16 can be adjusted up and down as well as in an angular direction to position the cutting edge of the ledger blade properly in relation to the fly-blade and the shearing line by reason of the adjustments above described can be kept at a fixed point until the fly-blade cutters and the ledger blade are practically worn out.

What I claim is:

1. In a cloth shearing machine the combination with a cutter head comprising side frames and a rigid cross-connecting girt, a transverse positioning and supporting cross head of rigid construction, means for securing said head firmly to said girt in different positions of angular adjustment, a heavy cast ledger beam provided with a flat longitudinal face, a ledger blade of tempered steel rigidly secured in face to face contact with said face, and means for securing said ledger beam with its attached blade to said cross head by alternating attaching and warping screws for securing the ledger blade in straight edge alignment, whereby the positioning of the ledger blade to a constant shearing line position as its cutting edge is worn back may be effected without disturbing the straight edge alignment of the blade.

2. A ledger blade of thin tempered steel fastened directly to a flat longitudinal face of a heavy ledger beam of stiff cast metal, a supporting and positioning cross head of rigid cast metal, means for rigidly securing said cross head in different positions of angular adjustment and of adjustment toward said fly blade, and means for rigidly securing said ledger beam to said rigid cross head in a position insuring straight edge alignment of said ledger blade, said means comprising a series of attaching and warping screws arranged in triangular grouping, whereby as the edge of the blade wears back the blade and its beam may be shifted to keep the cutting edge at a constant shearing line position.

3. In a cloth shearing machine the combination with a pivotally mounted cutter head, a shearing couple carried thereby embracing a revoluble fly blade and an associated stationary ledger blade secured directly to a stiff heavy cast beam by which the blade is maintained in straight edge alignment, an intermediate rigid supporting head secured to the cutter head by means for effecting both angular adjustment of said head and adjustment toward said fly blade, and warping means for securing the ledger beam rigidly to said intermediate head to maintain the ledger blade in straight edge alignment while permitting its adjustment to a constant shearing line position as the cutting edge is worn back.

4. In a cloth shearing machine the combination with a rotary fly-blade, of a ledger blade, a supporting casting, on which said ledger blade is fastened, a rigid cross-head, means for effecting the straight edge alignment of said blade comprising a plurality of set screws and binder screws arranged in triangular grouping for adjustably securing the ledger blade supporting casting to the rigid cross head, and means providing vertical and angular adjustment for said cross head to position the ledger blade in proper straight edge relation to the fly-blade without disturbing the straight edge alignment of said blade.

5. In a machine for face shearing a travelling web of cloth, the combination of a shearing couple comprising a rotary fly blade and an associated ledger blade, a straight edge cloth rest for guiding the cloth into an acute salient angle at the shearing line, an air blast conduit whose delivery nozzle is located forwardly of and in close proximity to the shearing line, the space between the nozzle and shearing line being unobstructed whereby said nozzle is arranged to deliver a cooling blast of air directly against the cutting edges of the shearing couple at the shearing line in the direction of travel of the cloth and of the rotary fly blade and whereby the nap of that portion of the cloth passing around the salient edge at the shearing line is raised and heat is simultaneously abstracted from the cutting edges of the shearing couple.

6. In a machine for face shearing a travelling web of cloth, the combination of a rotary fly blade and a coacting ledger blade in fixed relation thereto and forming therewith a shearing line for shearing the face of the cloth, a tubular conduit carried along both faces of the entire length of the ledger blade in contact with its medial portion, an acute angle cloth rest located in close proximity to the shearing line to present a salient portion of the cloth surface to the shearing line, and means for abstracting heat from the cutting edges of the fly blade and ledger blade comprising an air blast conduit having its nozzle arranged forwardly of and in close proximity to the shearing line, the space between the nozzle and shearing line being unobstructed whereby the nozzle may freely deliver a cooling blast of air against the cutting edges of the ledger blade and fly blade at the shearing line.

7. In a machine for face shearing cloth having a shearing couple comprising a rotary fly blade and a coacting relatively fixed ledger blade, means for maintaining lubrication of the cutting edges comprising a tubular oil reservoir mounted in proximity to the rotary fly blade and having its bottom provided at intervals with spaced oil outlet holes, an oil distributing swab clamped against the outside face of said perforated bottom and having its free portion lapped upon said rotary fly blade, a clamping plate arranged beneath the perforated bottom of said oil reservoir, and means for clamping the interposed portion of said swab against the perforated bottom with a predetermined but variable pressure to regulate the flow of oil through said holes into the swab.

8. In a cloth shearing machine, the combination with a rotary fly blade, of a ledger blade, a relatively stiff heavy supporting member to which the ledger blade is rigidly fastened, a rigid supporting cross-head, means for effecting the straight edge alignment of said blade comprising upper and lower rows of thrust screws that are individually staggered with relation to the individual screws of the other row, an intermediate row of binder screws tapped into a rigid supporting crosshead, said binder screws being in substantial alignment with one row of thrust screws and in staggered relation to the other row of thrust screws.

9. In a cloth shearing machine, the combination of a rotary fly blade, a ledger blade having a straight line cutting edge, relatively stiff supporting means for the ledger blade to maintain the same in straight edge alignment, said blade projecting towards the fly blade beyond the stiff supporting means, and a conduit for cooling fluids embracing the free portion of the ledger blade, the conduit extending from end to end of the ledger blade at a point closely adjacent the cutting edge thereof.

10. In a cloth shearing machine, the combination of a rotary fly blade, a ledger blade having a straight line cutting edge, relatively stiff supporting means for the ledger blade to maintain the same in straight edge alignment, said blade projecting towards the fly blade beyond the stiff supporting means, and a conduit for cooling fluids doubled on itself to form a pair of parallel branches extending longitudinally of the fly blade from end to end thereof closely adjacent the cutting edge of the ledger blade, the ledger blade extending between the branches of the conduit.

CHARLES G. RICHARDSON.